Dec. 4, 1962 C. BRADLEY 3,067,371
ELECTRIC MOTOR AND GOVERNING MEANS THEREFOR
Filed Feb. 14, 1961 6 Sheets-Sheet 1

INVENTOR.
CATON BRADLEY
BY Steward + Steward
ATTORNEYS

Dec. 4, 1962

C. BRADLEY 3,067,371

ELECTRIC MOTOR AND GOVERNING MEANS THEREFOR

Filed Feb. 14, 1961

INVENTOR.
CATON BRADLEY
BY Steward + Steward
ATTORNEYS

Dec. 4, 1962 C. BRADLEY 3,067,371
ELECTRIC MOTOR AND GOVERNING MEANS THEREFOR
Filed Feb. 14, 1961
6 Sheets-Sheet 3

INVENTOR.
CATON BRADLEY
BY Steward & Steward
ATTORNEYS

INVENTOR.
CATON BRADLEY
BY Steward + Steward
ATTORNEYS

Dec. 4, 1962   C. BRADLEY   3,067,371
ELECTRIC MOTOR AND GOVERNING MEANS THEREFOR
Filed Feb. 14, 1961   6 Sheets-Sheet 5

INVENTOR.
CATON BRADLEY
BY *Steward + Steward*
ATTORNEYS

United States Patent Office 3,067,371
Patented Dec. 4, 1962

3,067,371
ELECTRIC MOTOR AND GOVERNING MEANS THEREFOR
Caton Bradley, 5 Ridge Road, Bristol, Conn.
Filed Feb. 14, 1961, Ser. No. 98,278
19 Claims. (Cl. 318—330)

This invention relates to improvements in constant speed electric motors, and more especially to small or miniaturized direct current motors useful in timing and recording apparatus where a high degree of accuracy is required and minimum weight. The invention is particularly directed to speed governing means for such motors, and control of the energization thereof through the medium of a vibratory member, in the form of a reed, mounted to permit oscillation at its natural frequency of vibration.

The principal objective of the invention is the provision of a motor of extemely constant operating speed under conditions of substantial variation or fluctuation in supply voltage and mechanical load. Concomitantly with the foregoing is the objective of providing a motor-governor of simple, low cost construction, highly dependable in operation.

The novel governor portion of the motor construction is characterized by the use of a vibrating reed or strip of spring metal which is anchored to a pivot block or post to provide a length extending from the anchor point in cantilever fashion for free vibration at the natural frequency determined by the physical characteristics of the reed. As just mentioned, the post or block to which the reed is anchored is pivoted, its axis being substantially perpendicular to the plane of vibration of the reed. Additionally there is provided a pair of closely spaced stops or abutments, and means is provided either by the reed itself or by the pivot post to engage these stops in alternate directions of pivotal movement to limit such movement. Finally there is provided means for imparting to the pivot post oscillatory impulses produced by, and at a frequency proportional to the speed of rotation of, the rotor of the motor, which pulses are transmitted to the reed to cause it to vibrate. Energization of the motor windings, and consequently the speed of the motor, is controlled by the making and breaking of an electric circuit at the aforesaid stops or abutments. It is further a characteristic of the inventive concept here disclosed that the means for pulsing the pivot at the rotor frequency is effective to make and break the circuit of the motor winding during a very short interval occurring after the power is supplied to the motor, while the rotor is coming up to speed. But as soon as the pulses transmitted to the reed are sufficient to produce vibration thereof of a predetermined minimum amplitude, control of the energization of the motor windings, through the make-and-break contact arrangement described, passes automatically from the rotor speed sensing or pulse producing means to the vibratory reed. Thereafter the latter overrides the rotor speed sensing means and directly controls and governs the frequency of make-and-break contact at a speed equal to the natural period of its vibration. In this, the aforesaid stops or abutments limiting the angular movement of the pivot act as "back stops," absorbing or storing excess energy developed when the amplitude of vibration of the reed is above the previously mentioned required minimum. This arrangement results in the production of a variable period of dwell of the member engaging the stops (and therefore a variable period of energization of the motor windings), without altering the frequency of make-and-break contact, depending on whether the motor has an instantaneous tendency toward overspeeding or underspeeding.

The invention also embodies certain features of motor construction and component arrangement which make for lower manufacturing cost and yet provide a unit of rugged construction not readily affected adversely by shock or other physical treatment or mistreatment that the motor may be required to withstand.

Further objects and advantages of the invention will become more apparent from a detailed description of several embodiments illustrative of practical operating units shown in the accompanying drawings.

Referring to the drawings.

Figure 1:
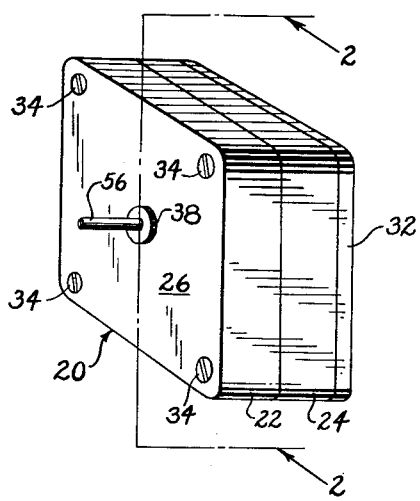
FIG. 1 is a perspective representation of an electric motor.
Figure 2:
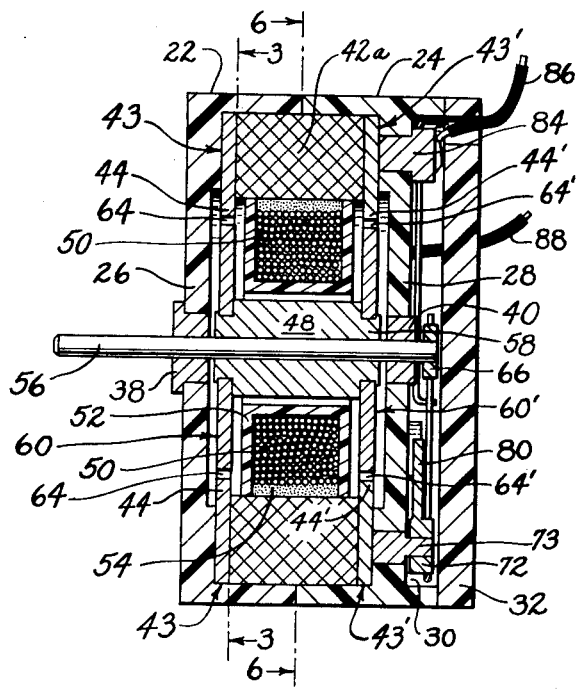
FIG. 2 is a vertical section, taken on plane 2—2 of FIG. 1, showing portions of the internal construction of the motor.
Figure 3:
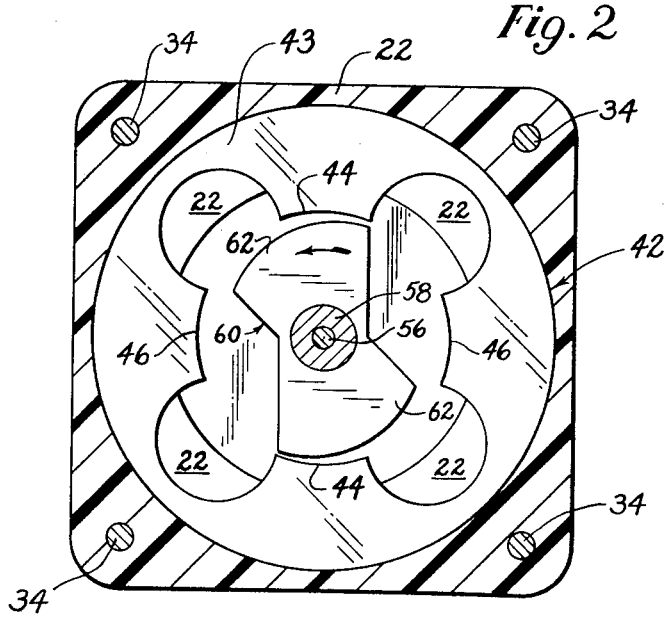
FIG. 3 is a sectional view in end elevation of the motor, taken on line 3—3 of FIG. 2.
Figure 4:
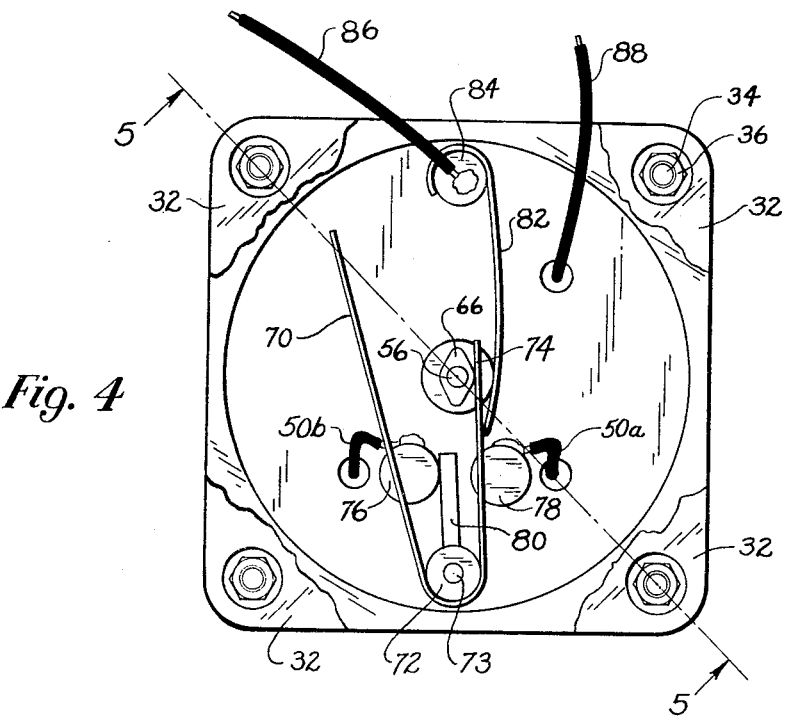
FIG. 4 is an end view, looking at the back of the motor, that is from the right in FIGS. 1 and 2.
Figure 5:
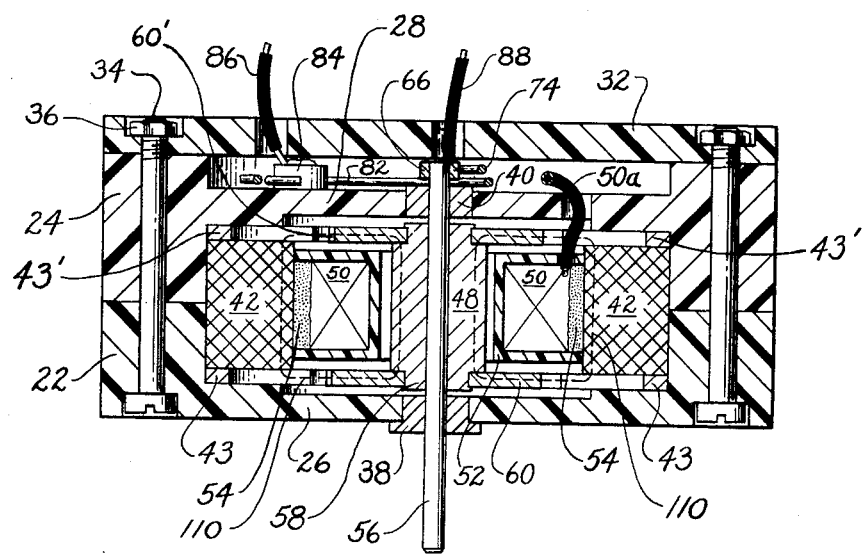
FIG. 5 is a sectional view in side elevation, taken on the diagonal 5—5 of FIG. 4.

Turning first to a description of motor unit 20 shown in FIGS. 1 through 5, a two-piece housing consisting of abutting cylindrical front and rear shells 22, 24, respectively, of generally rectangular section, having transverse partitions or closure walls 26 in the front member and 28 in the rear member, serves to enclose the motor components and protect them from damage. Typically the housing shells are formed of molded plastic or other non-magnetic material. It will be noted that rear housing shell 24 has a recess 30 in its back, for a purpose which will be described presently, and cover plate 32 is removably secured to the casing to enclose recess 30. The several members just described are held together by means of machine screws 34 passing through the members and secured by nuts 36 at the rear of the unit, as seen in FIGS. 4 and 5.

Each of the transverse partitions 26, 28, respectively, of the housing sections 22, 24, is apertured centrally and a bearing member inserted therein. Bearing 38 is carried in the front partition 26, while bearing 40 is similarly carried in rear partition 28, both being secured therein by a press fit or in other suitable manner.

Figure 6:
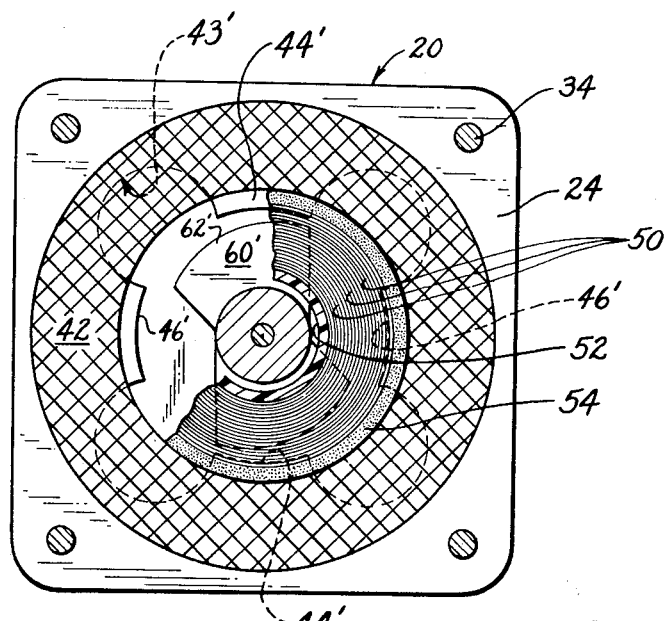
FIG. 6 is a view in vertical section on line 6—6 of FIG. 2, looking in the direction of the arrows, parts being broken away for greater clarity of illustration.

Housing members 22, 24, together telescopingly receive a generally toroidal stator assembly 42. Assembly 42 comprises a central ring member 42a of rectangular section, and a pair of annular plate-like pole members 43, 43', at the front and rear faces, respectively, of ring 42a. Pole member 43 is provided on its inner periphery, as seen best in FIGS. 2, 3 and 6, with inwardly projecting paired pole pieces 44, 46, or ends disposed circumferentially in alternating polarity relation at the forward end of the motor, while pole member 43' is provided with correspondingly paired pole pieces 44', 46', in alternating polarity at the rearward side of the stator assembly. The stator ring 42a is permanently magnetized and preferably is formed as an integral unit of a light weight iron oxide and ceramic composition, for purposes of miniaturization and minimum weight. Such material is well-known and a typical example of a commercially available form is sold under the trade name Indox by the Indiana Steel Products Company. The stator assembly fits closely within the cavity formed by the complementary housing members 22, 24, and is thus held rigidly in position therein.

A rotor assembly for the motor is disposed within stator 42, and consists of a rotor or armature 48 and a winding 50 for magnetizing the latter. Winding 50 is mounted to be stationary, being supported upon the inner surface of stator ring 42a intermediate the pole pieces at the axial ends thereof. As shown more particularly in FIGS. 2, 5 and 6, the winding is supported in a bobbin or spool 52, and as here shown is cemented at 54 about its outer periphery to the inner periphery of stator ring 42a. Winding 50 is bifilar for a purpose to be described presently, the turns being wound randomly about the bobbin hub.

Rotor 48 includes an axle 56 which is carried in bearings 38 and 40 of the housing, the axle passing through and being secured to a central hub 58 of soft iron or non-permanently magnetizable material. At each end of hub 58 there is mounted a soft iron or similar non-permanently magnetizable pole piece 60, 60', extending generally diametrically of the stator. As seen in FIGS. 2 and 5, the rotor poles 60, 60' are composed of opposed fan-shape pole pieces 62, 62', the outer periphery of which is of varying distance or radius from the center so as to provide a small, tapering air gap 64 between the periphery of the poles 60, 60' and the respective inwardly projecting stator pole pieces 44, 44', 46, 46'. The taper is employed to assure that the motor is self-starting. Poles 60, 60' are secured to the hub 58 by a drive fit to be spaced closely adjacent the sides of bobbin 52 and its winding 50 for magnetic coupling thereto. Poles 60, 60' are thus adapted and arranged to be magnetized by the winding alternately in one polarity configuration and then in the opposite configuration, depending on the direction of current through the winding. As seen in FIGS. 2 and 5, the rotor is separate from the winding and is freely rotatable independently thereof.

Axle or shaft 56 projects forwardly through the front bearing 38 to provide a power take-off for the motor. At the rear, within recess 30 in housing member 24, a dual lobe cam 66 is pinned or otherwise secured to shaft 56 behind bearing 40.

Referring now to FIG. 4, the speed control governor assembly for maintaining the speed of rotation of the rotor constant at a predetermined R.P.M. comprises, generally, a vibrating reed member 70 anchored to a pivot member 72 which latter, in turn, is coupled through a resilient arm 74 (or cam follower) to cam 66 on the rotor shaft. Pivot member 72 is carried on a stud 73 which serves as the axis of the pivot. As also here shown, vibrating reed member 70 and resilient arm 74 are formed integrally in the general form of a U or hairpin to substantially encircle the pivot. Resilient material, beryllium copper wire or strip being especially suitable, is used to make the integral reed and cam follower.

Cooperating with the reed, pivot and cam follower members is a pair of stops 76, 78. Projection 80 extending rigidly from pivot member 72 constitutes a movable arm interposed between the aforesaid stops, whereby angular movement of pivot 72 is limited by engagement of arm 80 therewith. A cam follower spring 82 is also provided, secured at one end to a post 84 and extending into resilient engagement with arm 74 to cause it to bear against the periphery of cam 56.

As illustrated in FIG. 4, stops 76, 78, serve also as stationary electrical terminals or switch contacts and are secured in any suitable manner in the rear partition 28 of the casing. Each of stops 76, 78, has connected to it a conductor constituting one end of winding elements 50b, 50a, respectively, of the bifilar winding 50. Pivot 72 and pivot arm 80 thereon are formed of a conductive material, as is cam follower spring 82. Accordingly electric power supplied through conductor 86 to post 84 is enabled to pass through spring 82, into arm 74 by the contact of the spring therewith, and thence through post 72 and arm 80 to one or the other of stops 76, 78, depending upon which of these arm 80 may be in contact with at the moment. In this manner circuit is completed through the respective elements 50a, 50b, of winding 50, and back through a common return lead 88 to a power source. The connection of the bifilar elements 50a, 50b, of winding 50 is such that current entering through stop 76 causes current to flow in one direction through the winding thereby producing one orientation of magnetization, while introduction of current through stop 78 causes flow through the winding in an opposite direction, thereby producing an opposite magnetization of winding 50.

Figure 7:
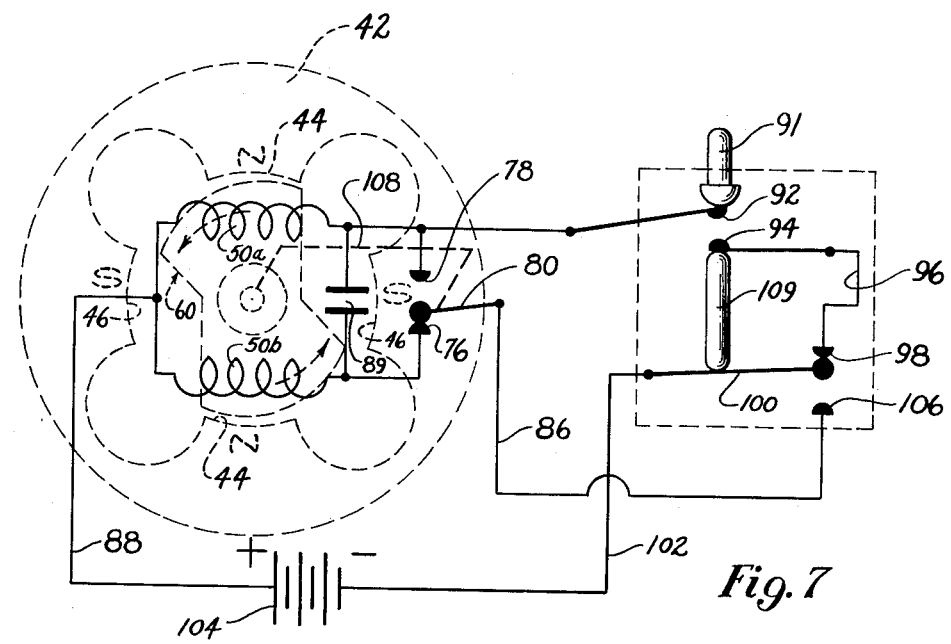
FIG. 7 is a schematic of the electric circuit of the motor of FIGS. 1 through 6 on which has been superimposed, in dotted line showing, portions of the rotor and stator assemblies of the motor.

A schematic of the electrical circuit of the foregoing is shown in FIG. 7 in which outlines of the rotor and stator have been superimposed in dotted lines. In the schematic illustration, the means for transmitting mechanical pulses produced by rotation of cam 66 to the pivot arm 80 is represented schematically by the dotted line 108. In this diagram there is also shown a condenser 89 shunted across stops 76, 78, to suppress arcing at the contacts, and also a switching arrangement 90 to provide electrical braking action to accelerate stopping the rotation of the rotor. This latter feature is desirable for many applications where the motor is used in recording apparatus. Briefly switching arrangement 90 comprises a pushbutton 91 adapted to close contacts 92, 94, which then forms a circuit through lead 96 to a contact 98. The circuit is completed through a leaf contact 100 to the power lead 102 to the negative side of power source 104. Spring leaf contact 100 forms part of a single-pole, double-throw, snap switch having an alternate stationary contact 106. The normal position of the switch is that shown in FIG. 6, in which spring leaf contact 100 is engaged with stationary contact 98 as aforesaid. However, upon fully depressing pushbutton 91, after engagement is made between contacts 92, 94, actuator 109 causes spring leaf contact 100 to snap to its alternate position in which contact is then broken at contact 98 and made at contact 106. In this condition the circuit from the negative side of the power source 104 is transferred through spring leaf 100, contact 106 to the feed conductor 86 of the motor and thence through the motor as described hereinabove.

Upon release of button 91, the first action is that of returning spring leaf 100 from engagement with contact 106 to engagement with contact 98, while contacts 92, 94, are still maintained in engagement. This causes a current to flow from power source 104 through contacts 100, 98, 94 and 92 to element 50a of the bifilar winding 50, thus tending to lock the rotor in fixed position. Finally, of course, upon complete release of button 91, the circuit is broken by separation of contacts 92, 94.

Before considering the action of the speed governing portion of the motor it will be helpful to understand the arrangement whereby the motor is made inherently self-starting, regardless of the last position of the rotor upon disconnecting the power source. Because of the tapered periphery of rotor poles 60, 60', whenever the motor is disconnected from the power source, the rotor will always tend to align itself in a position relative to one set or the other of the stator poles as illustrated in FIG. 3 (shown also in dotted lines in FIG. 7) because this presents a condition of lowest magnetic reluctance for the magnetic circuit of the permanently magnetized stator 42. Referring to FIG. 7, let it be assumed that when power is fed to contact 76, as shown in the illustration, the flow of current through element 50b of bifilar winding 50 produces a north polarity of the rotor pole 60 (that is the rotor pole adjacent the front of the motor), in which case the rear rotor pole 60' will accordingly be a south pole. Let it also be assumed that the polarity relationship of the permanently magnetized stator 42 is as indicated, wherein pole pieces 44 are of north polarity and pole pieces 46 are of south polarity. It will be understood, of course, that the respective pole pieces 44' and 46' at the other end of the stator assembly will be correspondingly of reverse polarity, that is, pole pieces 44' will be of south polarity and pole pieces 46' will be of north polarity.

Under the foregoing assumptions, current flowing through element 50b of the winding is arranged to produce a north polarity of rotor pole 60 which, because of the proximity of portions of the fan-shaped piece 62 to the stator pole 46 (a south pole), causes attraction to occur between the stator and rotor poles, causing the rotor assembly to turn in a counterclockwise direction as viewed in FIG. 7. In this condition the rotor poles will be attracted by and tend to line up with stator poles 46, being aided in this by repulsion of poles 44, 60, of the stator and rotor, respectively, which are of like polarity. As rotation occurs, shaft 56 and its associated cam 66 turns, causing cam follower 74 to shift contact of switch arm 80 of the pivot assembly from stop 76 to stop 78. As mentioned previously, the other element 50a of the bifilar winding is connected to produce an opposite polarity from that of 50b. Therefore, the rotor polarity is reversed and again attraction is produced between the next pair of rotor and stator poles, progressively about the stator, whereby the rotor continues to turn to line up with the next pair of poles, and the process continues.

If it be assumed, for example, that the rotor should stop in a position in which contact of arm 80 is made with stop 78 rather than stop 76 as in the previous example, this means that the relative position of rotor 60 would be 90° from that shown in FIG. 7. Therefore when power is supplied through switch arm 80 to stop 78, current flowing through element 50a of the bifilar winding produces, by assumption, south polarity of the rotor pole 60. It will be seen that this causes repulsion to occur between the rotor and stator poles 62, 46, and attraction between rotor and stator poles 62, 44, just as before, and hence the rotor will begin to turn in the same manner.

If the rotor should tend to stop in an intermediate position in which contact is completely broken between switch arm 80 and either of stops 76 or 78, this results in an unstable magnetic condition in the deenergized motor due to the tapered periphery of poles 60 and 60'. That is, should the rotor tend to stop at some such intermediate position, the permanent magnet stator will induce a polarization of the rotor poles whereby the rotor will tend to move to a position of minimum air gap, i.e. maximum flux density, which is the position illustrated in FIGS. 3 and 7. Such an intermediate position also represents a mechanically unstable condition in the illustrated motor construction due to the biasing action of follower spring 82 on cam 66 and thus on shaft 56.

Operation of the governor portion of the motor to maintain the rotor at constant predetermined speed occurs as follows. As previously mentioned, reed member 70 is secured to pivot 72 for free vibration of its unsecured end. The length of this reed member is selected to provide a natural frequency of vibration equal to twice the desired r.p.m. of the rotor where, as in the illustration, a double lobe cam is used. As already mentioned, cam follower arm 74 is resilient, that is it is capable of bending intermediate its fixed point of securement to pivot 72 and the point of bearing on cam lobe 66. And although cam follower arm 74 in the specific illustration here shown constituted an integral extension of reed member 70, it is of course not free to vibrate like the reed portion.

Accordingly, under initial starting conditions, arm 74 under the influence of cam 66 is operative to control the actuation of switch arm 80 on pivot 72, and to shift or oscillate arm 80 between contact stops 76 and 78 as the rotor turns. In so doing, of course, oscillatory impulses are imparted to vibrating reed portion 70 through the slight angular movement of pivot 72, and the reed accordingly starts vibrating. Momentarily, of course, such vibrations are of very low amplitude but after the contact arm 80 has been caused to strike either contact post 76, 78, only one or perhaps two times, the amplitude of vibration of the reed will increase, particularly since the motor shaft speed will be rapidly increasing during this momentary period.

A condition is quickly reached wherein the reed takes over the control of the actuation of the pivot protection 80, and the reason for this will now be explained. During the period of initial operation when the reed is vibrating at low amplitude, the reed absorbs and releases little energy. Thus it is that when the motor is starting up from a dead stop, the cam on the motor shaft controls the actuation of pivot arm 80 and the frequency of the make-and-break at stops 76, 78. However as the motor speed increases, cam 66 imparts more energy to cam follower 74 which in turn imparts this energy to the pivot 72 and thus to reed 70. But this additional energy is, in effect, absorbed by the "back-stopping" effect on the pivot arm 80 by its contact with stops 76, 78, which causes the reed to deflect a greater amount and thus absorb such additional energy. Although the reed continues to vibrate at its resonant frequency because of its inherent characteristics, its amplitude of vibration may vary, depending upon the amount of energy imparted to it by the pivot, which in turn is dependent upon the motor speed. When a certain amplitude of vibration has been reached, the reed thereafter has sufficient energy to supersede the urging of the cam and cam follower means upon the actuation of the pivot arm 80.

Under such circumstances, should the rotor speed momentarily tend to exceed that desired, the tendency or urging of the cam to shift the pivot arm 80 to the alternate position does not and cannot occur because the reed, through its stored energy, does not permit such action to occur until such time as the reed itself is ready for such switching to occur. This pivot or switch arm 80 tends to remain in contact with the last engaged stop 76 or 78, as the case may be, for a fraction of an instant longer, which has the effect of producing a drag on the rotor because its polarity does not immediately reverse as would occur if the cam were controlling the shifting of the switch arm 80. Thus the tendency to overspeed is resisted.

Conversely, if there is a tendency for the motor to slow down below desired speed, due to the imposition of a mechanical load or some change in supply voltage, the vibration of the reed overcomes the lag of the cam and cam follower to effect an alternate position of the pivot projection 80 and energization of alternate winding element 50 or 50a, and will, in spite of the cam and cam follower means, move pivot arm 80 to the alternate position, thus effecting an opposite polarization of the rotor momentarily sooner than it would have otherwise occurred. Thus the rotor is urged into faster rotation and its desired speed of rotation is consequently maintained.

It is essential to the foregoing action that the cam follower arm 74 be resilient in order to permit flexing thereof contrary to the momentary direction of movement that may be urged upon it by the rotor cam 16.

The embodiment of the motor just described is illustrative of a relatively simple form within the scope of the present invention having exceptionally stable speed characteristics. As such it has many useful applications primarily in apparatus requiring a constant speed operation of low or moderate torque load. The principles involved, however, are applicable to motors providing larger torque output, and such a motor is illustrated in FIGS. 8 through 11 of the drawings. It will be noted that in the previously described motor, a double air gap is involved in the flux path of the rotor circuit. This is best seen in FIG. 2 wherein the flux path is represented by the dotted line 110, from which it appears that between each of the rotor poles 60, 60' and the respective stator poles 43, 43', the magnetic flux must twice pass through the gaps 64 and 64'. This results in some loss of torque efficiency which for higher output motors is objectionable. Such objection is obviated in the embodiment illustrated in FIGS. 8 through 10.

Figure 8:
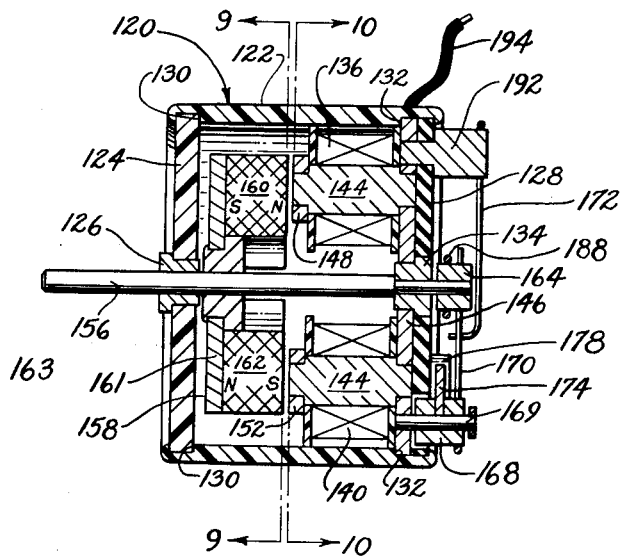
FIG. 8 is a sectional view in side elevation of a modified form of motor.

Referring to FIG. 8, motor 120 comprises a generally cylindrical frame or housing member 122 of non-magnetic, preferably plastic, material. A front partition 124 closes the forward end of frame 122, and is provided centrally with a bearing 126 suitably secured in the partition. The rear face of frame 122 is closed by a similar partition 128 of insulating material. As here illustrated, the ends of housing 122 are counterbored at 130, 132, at the front and rear, respectively, and the partitions 124, 128, are received therein and secured by peening over or staking the lip of the frame. Rear partition 128 is also provided with a central bearing 134 similar to the forward bearing 126.

Figure 10:
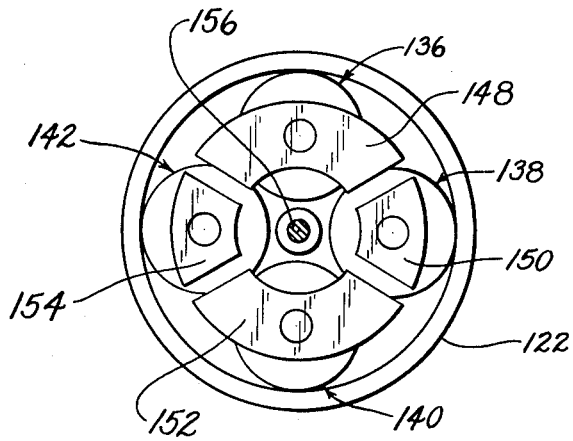
FIG. 10 is a view similar to FIG. 9 but looking in the opposite direction, taken on the line 10—10 of FIG. 8.

Within housing 122 there is disposed a stator assembly, as best seen in FIGS. 8 and 10, which comprises four spool type windings 136, 138, 140, 142 arranged with their axes parallel to the motor axis in circular fashion thereabout. Each of these windings is supported on a central iron core 144 which is secured at the rear of the motor to a soft iron or other non-permanently magnetizable plate 146. The latter is positioned within the case directly beneath the rear partition 128, being engaged at its periphery in the counterbore 132 and being held therein by the rear partition.

Toward the front of motor 120, each of the spool windings is provided with a pole piece of generally sectoral shape, the four such pole pieces complementing each other to provide a generally annular structure (see FIG. 9) in which the respective pole pieces are separated from each other by small radial gaps. The aforesaid pole pieces are designated at 148, 150, 152 and 154, respectively, for the windings 136, 138, 140, 142. These present a plane surface within the motor parallel to the front and rear partitions thereof. It will be noted that the pole pieces 148 and 152 are substantially twice as large, in angular extent, as are pole pieces 150 and 154. The purpose of this will be explained hereinafter.

Figure 9:
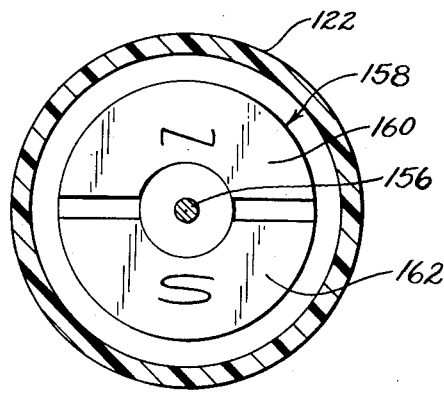
FIG. 9 is an end view, in section, taken on line 9—9 of FIG. 8.

The rotor used in conjunction with this form of motor is shown in FIGS. 8 and 9, wherein there is shown a rotor axle or shaft 156 journaled in bearings 126, 134, at the forward and rear partitions, respectively, of the motor unit. Fixedly secured to this shaft 156 is a permanent magnet rotor 158. This rotor comprises two generally semicircular permanent magnets 160, 162, polarized axially of the rotor assembly to present respectively opposite north and south pole faces, as shown in FIGS. 8 and 9, adjacent the stator pole pieces 148, 150, 152, 154. The magnetic segments 160, 162 are of such size and shape and are so disposed as to confront face-to-face and substantially coincide with a pair of the larger and smaller stator pole pieces together, as for example 148 and 150, or 152 and 154. Here again an iron oxide-ceramic type of permanent magnet material is preferable from the standpoint of minimum weight for the rotor magnets 160, 162. The mounting of these magnets is accomplished by securing them to the face of an annular shoe or plate 161 in spaced, diametrically opposed relation (FIG. 9), plate 161 being formed of soft iron or other magnetic material to provide a magnetic path of low reluctance between the faces of the poles adjacent the plate. Plate 161 in turn is carried on a hub 163 which is keyed to rotor shaft 156 and the exposed rotor magnet faces are thus disposed to lie in a plane parallel to and closely adjacent the stator pole pieces.

Figure 11:
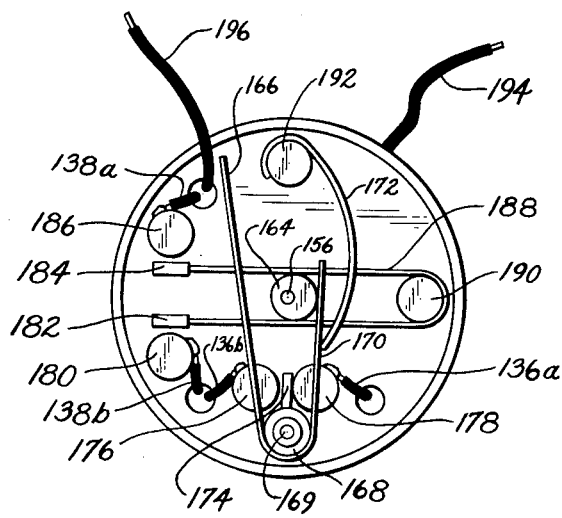
FIG. 11 is an end view of the rear of the motor unit of FIG. 8.

At the rear of partition 128 there is arranged a speed governor assembly for controlling the rotor speed of the motor. Referring to FIG. 11, an eccentric or cam 164 is fixedly secured on the rear of rotor shaft 156. A vibrating reed member 166 and pivot 168 to which reed 166 is anchored, and a resilient cam follower arm 170 and cam follower spring 172, are also provided. All of these are substantially identical with the corresponding components in motor 20 described hereinabove except that the cam in this instance has but a single lobe whereas cam 66 has a dual lobe. Pivot 168 is carried on a stud 169 for free rotation thereon. Pivot arm 174, rigidly secured to pivot 168, extends radially therefrom and between stops or abutments 176, 178. These stops are arranged to be engaged alternately by the pivot arm as the latter swings in one direction and then the other, all as previously described. Stops 176, 178, as before, constitute electrical contacts to which motor windings are connected and are herein sometimes referred to as the governing contacts.

In addition to the foregoing governing contacts, there are also provided in this case two sets of commutating contacts 180, 182, and 184, 186, respectively. Contact members 180 and 186 are stationary, being secured to the partition 128 so as to be insulated from each other, while contact members 182 and 184 are movable, being supported, respectively, on opposite legs of a U-shaped leaf spring 188. Spring 188 is secured to a post 190 fastened to the rear partition 128. The legs of spring 188 straddle the eccentric 164 so as to bear against diametrically opposite points thereon and are alternately flexed thereby to cause electrical contact to be completed through the respective commutating contact sets 180, 182 and 184, 186 with rotation of shaft 156 and eccentric 164.

Cam follower spring 172 is carried by a mounting post 192 which passes through the rear partition 128 and is staked or otherwise secured to the coil mounting plate 146 to provide electrical contact therewith. Mounting post 190 for leaf spring 188 is similarly secured to plate 146.

Current to operate the motor is fed through conductors 194, 196, conductor 194 being connected directly to the coil mounting or ground plate 146, while the lead 196 passes into and makes a common connection with one leg of each of the windings of the coils 140 and 142. (See FIG. 12.)

Figure 12:
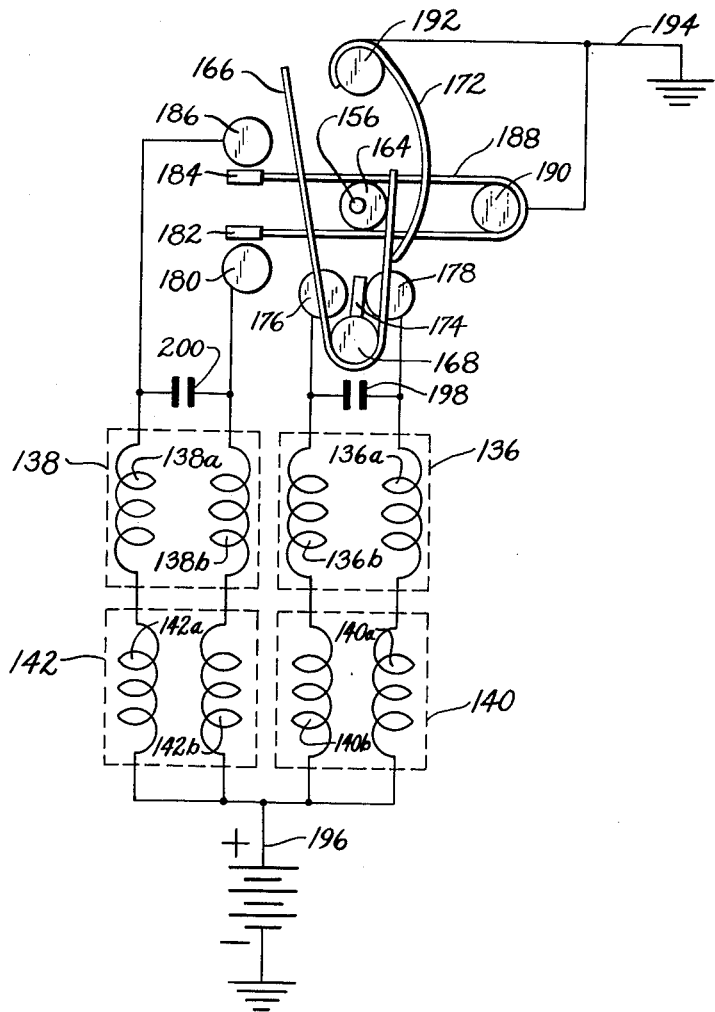
FIG. 12 is a schematic diagram of the electrical circuit for the motor of FIG. 8.

Referring now to the schematic circuit diagram in FIG. 12, it will be seen that again each of the windings of the coils 136, 138, 140, 142, is bifilar, whereby current passing through one of the coils produces a polarization of one configuration, whereas current passing through the other element of the bifilar winding produces a reversed polarity configuration.

Coils 136 and 140, as has been noted above, are associated with pole pieces 148, 152, respectively, which pole pieces are twice the size of the remaining pole pieces 150, 154. Coils 136, 140, and their associated pole pieces are directly under the control of the vibrating reed 166, and the governing action provided thereby occurs in the same manner as described in connection with the preceding motor embodiment. It will be noted that the respective elements 136a and 140a of coils 136 and 140, respectively, are connected in series, but in opposite polarity-producing relation, between the current supply lead 196 and the contact stop or abutment 178 of the governor assembly. Similarly, elements 136b and 140b of these same coils are connected in series relation but opposite polarity-producing relation between the supply lead 196 and the other contact stop 176 of the governor assembly. And as already mentitoned, the relationship of each of the elements of the bifilar windings is such as to produce opposite polarization of its respective pole piece for the same direction of current flow supplied to the coil.

A similar arrangement is provided for coils 138 and 142, each of which is also bifilar, the elements within each winding being arranged in opposition to the other and being connected in series with an element of the other winding, and in opposite polarity-producing relation thereto. Thus elements 142a and 138a are connected in series between power lead 196 and stationary contact 186, while elements 142b and 138b are connected in series between the same power lead and stationary contacts 180.

In order to reduce arcing at the several contacts, capacitors 198 and 200 are shunted across contacts 176, 178 and 180, 186, respectively.

The operation of the vibrating reed 166 and its associated components is identical with that heretofore described in the first embodiment except that in this instance the pulsing of the pivot 168 to produce vibration of the reed 166 is occasioned by the eccentric 164 rather than double lobe cam arrangement of motor 20. The reed pulsing frequency in motor 120 is, consequently, only half that produced by the double lobe cam arrangement, but the operation of the reed and the manner in which it takes over control of the oscillation of the pivot arm 174 to introduce current to the respective coils 136 and 140 is identical with that heretofore described.

The purpose of the auxiliary or booster coils 138, 142 is to carry the rotor past "dead spots" which would result normally from the use of the eccentric 164 rather than the double lobe cam previously described. Whereas in the construction of motor 20, polarity reversal of coils 50a, 50b, occurs every 90° of rotor rotation, reversal of the field coils in motor 120 occurs only every 180° of rotation. Thus eccentric 174 is made to operate the leaf spring contacts 182 and 184 alternately to complete the circuit through the respective auxiliary coil elements, thereby smoothing out the power pulses delivered by the motor and giving the motor a more uniform torque output. As previously mentioned, stator poles 150, 154, are only half the angular extent of the poles 148, 152 of the main or governing coils. This is to prevent overpowering of the governing coils by the commutating coils and loss of constant speed governing effect thereof. The setting of the gap at commutating contacts 180, 182, and 184, 186, respectively, is likewise adjusted to cause these contacts to remain closed only through a rotor arc of about 60°, overlapping the transition of the movable governing contact 174 between posts 176, 178.

A motor such as motor 120 just described will be quite suitable for various small motor applications without resorting to encapsulation of governing contacts 176, 178 or commutating contacts 180, 182, 184 and 186. However, as torque loads increase and consequently the amount of current passing through the motor is increased, objectionable arcing may occur and in that event it is preferable to enclose the various sets of contacts in a hermetically sealed non-oxidizing atmosphere to prevent deterioration of the contact points. In such event it is necessary to replace the direct mechanical pulsing of the movable contact members, as shown in both the foregoing specific embodiments, with indirect pulsing means such as a magnetic coupling arrangement to permit the same operation to be performed without direct mechanical linkage. Such a modification is obviously within the purview of the present invention and is intended to be covered by the accompanying claims.

It is also obvious that many other specific modifications in the particular form and construction of the motor and governor components may be made without departing from the spirit and scope of the present invention. Thus, instead of employing a separate contact making-and-breaking member such as the pivot arms 80 or 174 of the above described embodiments, the vibrating reed member itself may be employed to provide this function by disposing it in such position that it alternately contacts the spaced stops and thus completes the respective circuits. In general, however, this latter arrangement is less desirable than that specifically described above, as it has a tendency to interfere with the free oscillation of the vibrating reed member.

It may also be mentioned here that in place of the tapered periphery of the rotor of the motor embodiment shown in FIGS. 1 through 6, the periphery of the respective rotor poles may be at uniform distance from the axis but in that event each pole should be provided with an aperture located eccentrically of the radius of symmetry of the respective rotor pole pieces. Such a pole produces the same magnetic effect as the tapered periphery of the rotor specifically illustrated, and further offers some advantage in weight saving where extreme miniaturization is a significant factor.

For purposes of compactness the arrangements here described show the vibrating reed member and its pulse producing cam follower disposed in a generally hairpin or U-shaped configuration. It is quite apparent, however, that this is not essential and that these members might well be arranged on opposite sides of the axis of the pivot or at other points relative thereto, and in some application this may indeed be preferable, for example in motors designed especially for electric clocks.

These and other changes may obviously be made within the scope of the invention and such changes as are properly within the scope of the appended claims are accordingly intended to be covered thereby.

What is claimed is:

1. In an electric motor having a rotor, a stator and a winding, a constant speed governor comprising a vibrating reed member, a pivot member to which one end of said reed is anchored and spaced stops constituting abutments alternately engageable by one of said reed member and pivot member; electric circuit closing means, connected in series with said motor winding, operated by the said engaging member when abutting either of said stops, to energize said winding; means actuated by said rotor to impart pulses through said pivot member to said reed at a frequency proportional to the speed of said rotor to initiate and maintain vibration of said reed member, whereby above a given minimum amplitude of vibration of said reed, abutment of the said member against said stops alternately occurs at the frequency of reed vibration.

2. In an electric motor having a rotor, a stator and a winding, a constant speed governor comprising a vibrating reed member, a pivot member to which said reed is anchored to provide a free length having a predetermined natural frequency of vibration and means for mounting said pivot member to provide limited pivotal movement thereof in the plane of vibration of said reed; fixed abutments radially spaced from said pivot member and a rigid projection thereon extending between said abutments, said abutments being spaced circumferentially about said pivot member a predetermined distance such that said pivot projection alternately contacts said abutments whenever said reed reaches a predetermined minimum amplitude of vibration; pulsing means for producing vibration of said reed comprising a resilient arm fixedly secured to said pivot member, means carried by the rotor and coacting with said arm to produce oscillatory pulsations of the latter in a plane parallel to said reed vibration; and electrical circuit closing means provided by said pivot projection and at least one of said fixed abutments, said circuit closing means being connected in series with said motor winding and operated to complete an energizing circuit through said winding whenever said projection is in contact with one of said abutments.

3. A constant speed control device as defined in claim 2, wherein said pulsing means on said rotor is a cam, and said resilient arm comprises a cam follower in contact therewith.

4. A constant speed control device as defined in claim 3, which further includes a spring member continually urging said resilient arm into contact with said rotor cam.

5. A constant speed control device as defined in claim 4, wherein said spring member is electrically conductive and is provided with terminal means for connection to a source of electrical energy, and said resilient arm, pivot projection and abutment are also electrically conductive.

6. A constant speed control device as defined in claim 2, wherein said vibrating reed member and resilient arm are integrally joined at their point of attachment to said pivot member.

7. A constant speed control device as defined in claim 6, wherein said reed and resilient arm are disposed in a U-shape about said pivot member and are anchored to the latter at the closed end of the U.

8. Vibrating reed governor means for an electric motor, comprising a pair of fixed abutments in spaced relation, at least one of which comprises electric contact means connected to an energizing circuit for the motor; a movable contact member disposed between said fixed abutments for oscillatory movement therebetween, said movable contact member being disposed in circuit between said first contact means and a source of electric power; a vibrating reed member operatively associated with said movable contact member for controlling the oscillatory movement thereof; pivotal mounting means to which said reed is anchored to dispose a length thereof for free vibration at its preselected natural frequency; and pulsing means for imparting oscillatory pulses through said pivotal mounting means to said reed at a frequency proportional to the speed of the motor, whereby said movable contact member is oscillated between said fixed abutments at a frequency substantially the same as the natural frequency of oscillation of said reed member.

9. Vibrating reed governor means as defined in claim 8, wherein said pulsing means for imparting oscillatory pulses to said reed is a resilient arm fixed at one end to said pivotal mounting means and adapted and arranged to be engaged adjacent its other end by a cam driven by the motor.

10. Vibrating reed governor means as defined in claim 9, wherein the vibrating reed and resilient arm are integral.

11. Vibrating reed governor means as defined in claim 10, wherein said reed and resilient arm are located on the same side of said pivotal mounting means.

12. A constant speed direct current motor comprising a permanently magnetized toroidal stator assembly having on its inner periphery at least two pairs of poles disposed at each of its axially opposite ends, the poles at opposite ends of said assembly being aligned and of opposite polarity; a rotor journaled for rotation within said stator and having soft iron poles cooperating with the stator poles at the respectively opposite ends; a winding separate from but disposed about said rotor intermediate the poles thereof for alternately magnetizing said rotor poles to one polarity and then the other; and governor means for maintaining the speed of rotation of said rotor constant over a predetermined range of supply voltage and mechanical load, said governor means comprising a pair of fixed contact members, at least one of which is connected to said rotor winding, a movable contact member disposed between said fixed contact members for alternate engagement therewith, said movable contact member serving to complete an electrical circuit to said rotor winding contact member from a source of electrical power; pivot means on which said movable contact is mounted, said pivot means being free to move within angular limits determined by abutment of said movable contact with said fixed contacts; a vibrating reed member anchored at one end to said pivot means to dispose a predetermined length of said reed for free vibration at its natural frequency in a plane substantially perpendicular to the axis of said pivot; and pulsing means actuated by said rotor for imparting angular displacement to said pivot about its axis at a frequency proportional to the speed of the motor.

13. A constant speed direct current motor as defined in claim 12, wherein said rotor winding is bifilar and one end of each of the winding elements is connected to one of said fixed contact members, said winding elements being so disposed as to produce opposite magnetic polarization of the rotor for the same direction of current flow to said movable contact member.

14. A constant speed direct current motor as defined in claim 12, wherein said pulsing means for said reed comprises a dual lobe cam secured to said rotor shaft, and a resilient arm rigidly secured at one end to said pivot means with its opposite end engaging said cam to act as a cam follower, the lobes of said cam being diametrically opposed thereon.

15. In a constant speed motor, the combination which comprises a frame; a rotor journaled for rotation in said frame and provided with permanently magnetized, paired poles having pole faces thereon; a stator assembly mounted in said frame, comprising first and second pairs of stator poles and a winding for each; pole faces for each of said stator poles disposed at one end of said stator assembly in generally circular arrangement about the axis of said rotor, said rotor and stator pole faces being in closely spaced relation to each other; speed governor means for said motor comprising a vibrating reed member, a pivot member to which one end of said reed is anchored, and spaced stops constituting abutments alternately engageable by one of said reed member and said pivot member; electric circuit closing means, connected in series with said first pair of diametrically opposed stator pole windings for energization thereof from a source of power, said circuit closing means being operated by said engaging member when abutting either of said stops to close a circuit to a winding of one of said first pair of opposed stator poles; means actuated by said rotor to impart pulses through said pivot member to said reed at a frequency proportional to the speed of said rotor to initiate and maintain vibration of said reed member, whereby above a given minimum amplitude of vibration of said reed, alternate abutment of said member against said stops occurs at the frequency of reed vibration; and a second, independent contact means operated by said rotor to close a circuit to a winding of one of said second pair of stator poles.

16. The combination as defined in claim 15, wherein the pole faces of said stator poles are approximately of sector shape and are disposed in spaced circular arrangement about the rotor axis in a plane perpendicular thereto; said rotor pole faces being approximately of semicircular shape and disposed in face-to-face relation with said stator poles.

17. The combination as defined in claim 15, wherein the means actuated by the rotor to pulse said reed comprises an eccentric fixed to said rotor shaft, and a resilient arm engaging at one of its ends the surface of said eccentric and being secured at its opposite end to said pivot member.

18. The combination as defined in claim 17, wherein said second contact means includes movable contact members engaging said eccentric and operated thereby in timed sequence with the rotation of said motor.

19. The combination as defined in claim 18, wherein said second contact means comprises a double set of contacts, alternate sets of which are closed for approximately 60° of rotor rotation overlapping the transition of said governor contact engaging member between said spaced stops.

No references cited.